(12) United States Patent
Martens

(10) Patent No.: US 8,372,173 B2
(45) Date of Patent: Feb. 12, 2013

(54) LIQUID SEPARATOR

(75) Inventor: Kristof Adrien Laura Martens, Grimbergen (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 423 days.

(21) Appl. No.: 12/675,148

(22) PCT Filed: Aug. 21, 2008

(86) PCT No.: PCT/BE2008/000068
§ 371 (c)(1),
(2), (4) Date: Feb. 25, 2010

(87) PCT Pub. No.: WO2009/026662
PCT Pub. Date: Mar. 5, 2009

(65) Prior Publication Data
US 2010/0300051 A1 Dec. 2, 2010

(30) Foreign Application Priority Data
Aug. 29, 2007 (BE) .................................. 2007/0414

(51) Int. Cl.
*B01D 50/00* (2006.01)

(52) U.S. Cl. ............. 55/337; 55/459.1; 55/345; 55/410; 55/413; 55/417

(58) Field of Classification Search .................. 55/337, 55/495.1, 345, 410, 413–417, 424–427
See application file for complete search history.

(56) References Cited

U.S. PATENT DOCUMENTS

| | | | | |
|---|---|---|---|---|
| 3,107,988 A | * | 10/1963 | Taylor et al. ..................... | 55/311 |
| 3,594,991 A | * | 7/1971 | Berz et al. ........................ | 55/294 |
| 3,653,191 A | * | 4/1972 | Nelson et al. ................... | 55/310 |
| 3,778,984 A | * | 12/1973 | Lawser ............................ | 55/333 |
| RE28,396 E | * | 4/1975 | Berz et al. ........................ | 55/294 |
| 3,917,472 A | | 11/1975 | Berz | |
| 3,934,990 A | * | 1/1976 | Ide, III ............................ | 96/408 |
| 4,842,622 A | * | 6/1989 | Wamsley, Jr. ................... | 96/406 |
| 4,865,632 A | * | 9/1989 | Yano et al. ....................... | 96/212 |
| 4,975,100 A | * | 12/1990 | Ginelli ............................. | 96/397 |
| 5,002,593 A | * | 3/1991 | Ichishita et al. ................ | 96/137 |
| 5,170,640 A | * | 12/1992 | Heitmann et al. .............. | 62/470 |

(Continued)

FOREIGN PATENT DOCUMENTS

| | | |
|---|---|---|
| DE | 2550087 A1 | 5/1977 |
| EP | 0673864 A1 | 9/1995 |

(Continued)

OTHER PUBLICATIONS

Examination Report of Russian Patent Office regarding RU 2010111771/05 (016556), May 19, 2011.

(Continued)

*Primary Examiner* — Jason M Greene
*Assistant Examiner* — Dung H Bui
(74) *Attorney, Agent, or Firm* — Bacon & Thomas, PLLC

(57) ABSTRACT

Liquid separator having a centrifugal separator and a fine separator through which a gas to be purified can flow. The centrifugal separator has a cylindrical housing with a tangential inlet and an axial outlet. The fine separator has a housing which defines a space and is isolated from the inner space of the centrifugal separator using a non-return valve.

11 Claims, 3 Drawing Sheets

U.S. PATENT DOCUMENTS

| | | | | |
|---|---|---|---|---|
| 5,484,521 A * | 1/1996 | Kramer | | 210/86 |
| 5,575,596 A | 11/1996 | Bauer et al. | | |
| 5,693,125 A * | 12/1997 | Dean | | 96/157 |
| 5,922,093 A * | 7/1999 | James et al. | | 55/322 |
| 6,033,450 A * | 3/2000 | Krul et al. | | 55/345 |
| 6,071,321 A * | 6/2000 | Trapp et al. | | 55/318 |
| 6,827,753 B2 * | 12/2004 | Matsubara et al. | | 55/417 |
| 7,410,527 B2 * | 8/2008 | Wagner et al. | | 95/271 |
| 7,422,612 B2 * | 9/2008 | Pietschner | | 55/309 |
| 7,766,989 B2 * | 8/2010 | Lane et al. | | 55/426 |
| 2003/0172632 A1 * | 9/2003 | Matsubara et al. | | 55/417 |
| 2004/0103785 A1 * | 6/2004 | North | | 95/271 |
| 2004/0237484 A1 * | 12/2004 | Altvater et al. | | 55/345 |
| 2006/0162299 A1 * | 7/2006 | North | | 55/345 |
| 2006/0236855 A1 | 10/2006 | Handte | | |

FOREIGN PATENT DOCUMENTS

| | | |
|---|---|---|
| EP | 1516574 A2 | 3/2005 |
| EP | 1527807 A1 | 5/2005 |
| RU | 2008070 C1 | 2/1994 |
| RU | 2207183 C1 | 6/2003 |
| SU | 1510895 A2 | 9/1989 |

OTHER PUBLICATIONS

International Search Report established in PCT/BE2008/000068, Dec. 17, 2008.

* cited by examiner

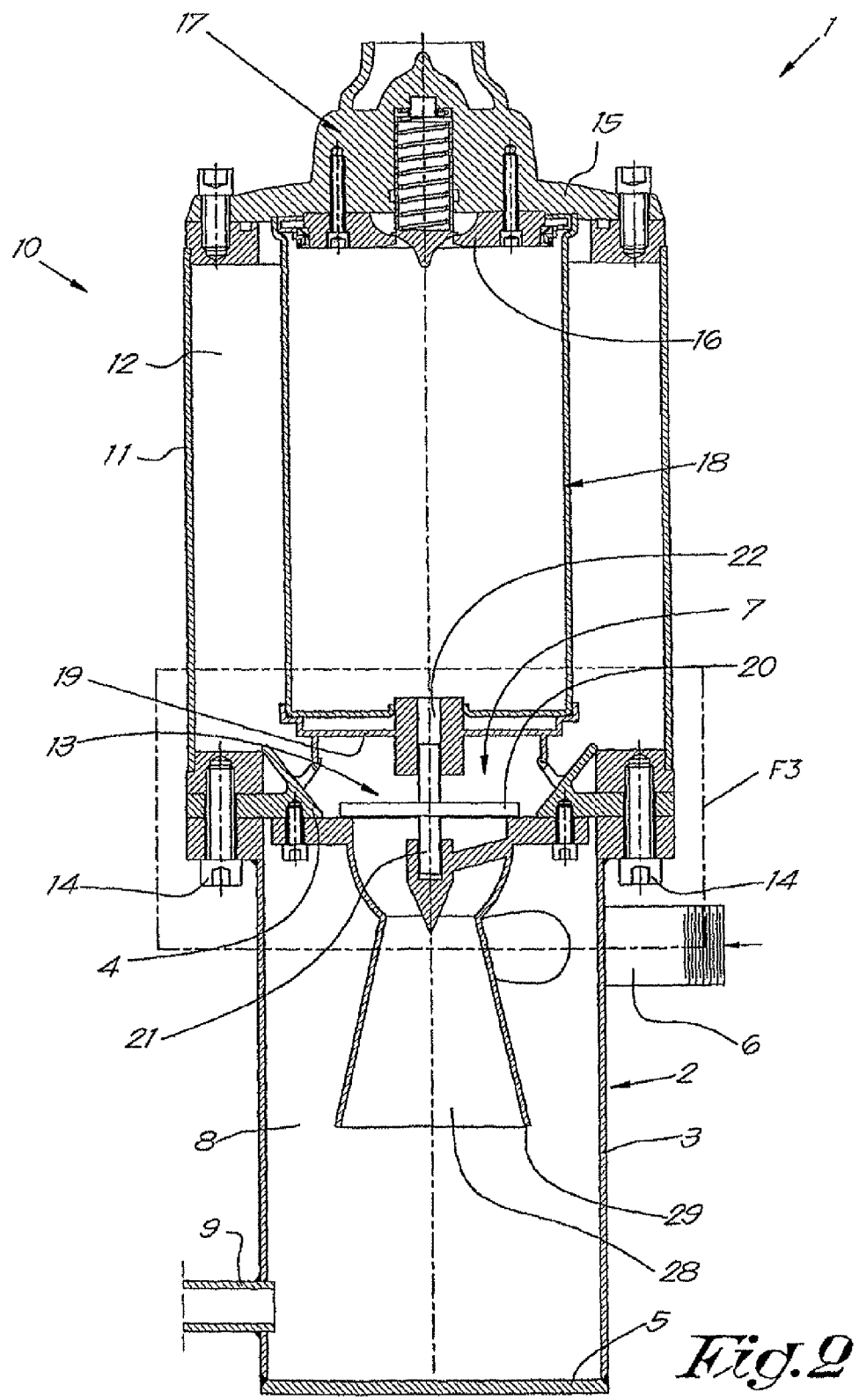

LIQUID SEPARATOR

FIELD OF THE INVENTION

The present invention concerns a liquid separator, in particular a liquid separator which can be provided in the compressed air line of an oil-injected compressor to separate oil from compressed air.

BACKGROUND

Liquid separators of the known type are provided with a centrifugal separator and a fine separator with a flow-through element through which a gas to be purified can flow, whereby the centrifugal separator consists of a cylindrical housing having a tangential inlet and an axial outlet, which housing defines an inner space in which has either or not been provided a screen to guide the flow towards the outlet.

In the known liquid separator, the above-mentioned fine separator is entirely formed of the flow-through element, and this flow-through element, for example in the form of a coalescence filter, is provided in the inner space of the cylindrical housing of the centrifugal separator, and the flow-through element is erected such that, if the above-mentioned screen is present, said screen extends around the flow-through element, to which end the screen has been made in the shape of a cylindrical tube.

When using a known liquid separator, a mixture of gas and liquid is supplied via the above-mentioned tangential inlet, for example in the form of compressed air coming from an oil-injected compressor.

As the above-mentioned inlet is placed tangentially on the cylindrical housing, the incoming mixture of gas and liquid, as is known, is subjected to a whirling motion, whereby a pre-separation occurs since, due to the centrifugal effect, the relatively heavy liquid particles are swung against the inner side of the cylindrical wall and carried off along said wall to the bottom of the liquid separator due to the gravitational force, where the separated liquid can be discharged if required, for example via a liquid outlet provided to that end.

The gas from which the relatively heavy liquid particles have been separated subsequently flows, as is known, via the space between the screen and the flow-through element if a screen is present, or via the space between the housing of the centrifugal separator and the flow-through element, through the flow-through element in order to separate the smaller liquid particles which are still present in the gas flow.

Finally, the purified gas flow leaves the liquid separator via the gas outlet, so as to be subsequently used for example for further applications.

A disadvantage of the known liquid separators is that, because of the presence of the above-mentioned flow-through element in the housing of the centrifugal separator, they are relatively sizeable and expensive.

Another disadvantage of the known liquid separators is that, because of their relatively large dimensions, they come under a stringent inspection category, which is disadvantageous as far as the cost of the inspection is concerned.

When such known liquid separators are applied to the compressed air line of an oil-injected compressor, as the compressor switches from a loaded to an unloaded condition, the gas volume is blown off as a whole from the space in the housing of the centrifugal separator through the fine separator until the equilibrium pressure for the unloaded working condition is reached.

The relatively large air volume has to be blown off quickly so as not to restrict the number of loaded/unloaded cycles too much.

A disadvantage thereof is that, as the blowing off is done quickly, the oil will strongly foam. The rising foam and the contamination that is solved therein deteriorate the operation of the fine separator, result in an excessive oil consumption and also reduce the life of the fine separator.

An additional disadvantage of the known oil separators is that the flow-through element, as a result of the pressure relief and the accompanying high gas velocities, is mechanically loaded while a volume of gas is being blown off during the transition from a loaded to an unloaded condition of the compressor, which is disadvantageous to the life span of said flow-through element.

SUMMARY

The present invention aims to remedy one or several of the above-mentioned and other disadvantages.

To this end, the present invention concerns a liquid separator which is provided with a centrifugal separator and a fine separator through which a gas to be purified can flow, whereby the centrifugal separator is formed of a cylindrical housing with a tangential inlet and an axial outlet, whereby the fine separator comprises a housing defining a space which is isolated from the internal space of the centrifugal separator by means of a non-return valve being configured so as to allow a fluid flow from said inner space of the centrifugal separator to the space in the fine separator.

An advantage of a liquid separator according to the invention is that, as the flow-through element is no longer provided in the internal space of the centrifugal separator, the centrifugal separator can be made considerably smaller and cheaper.

Another advantage of liquid separators according to the invention is that their centrifugal separator and fine separator, because of the smaller dimensions and separated volumes, come under a less stringent inspection category than conventional liquid separators, which is economically advantageous.

When a liquid separator according to the invention is applied to the compressed air line of an oil-injected compressor, only the gas volume will be blown off from the space in the housing of the centrifugal separator during the transition of a loaded to an unloaded condition of the compressor, whereas the space in the fine separator remains under pressure at all times.

This is advantageous in that the flow-through element is not mechanically loaded by a sudden pressure relief and high air velocities, as a result of which the life span increases in comparison with known liquid separators.

Another advantage thereof is that, as the volume of gas to be blown off is relatively small, the blowing off can be done slower than with the conventional liquid separators, as a result of which the risk of foam being formed is strongly reduced in comparison with the known liquid separators.

As the spaces in the centrifugal separator and the fine separator are separated, the blown-off volume will be smaller in a liquid separator according to the invention than in the conventional liquid separators, as a result of which there will be less losses due to the blowing off, as less pressure energy is contained in the blown-off gas which can escape into the atmosphere.

BRIEF DESCRIPTION OF THE DRAWINGS

In order to better explain the characteristics of the invention, the following preferred embodiment of a liquid separator according to the invention is described as an example only without being limitative in any way, with reference to the accompanying drawings, in which:

FIG. 2 shows a section according to line II-II in FIG. 1;

FIG. 3 shows the part indicated by F3 in FIG. 2 to a larger scale.

DETAILED DESCRIPTION OF VARIOUS EMBODIMENTS OF THE DISCLOSURE

Figure 1:
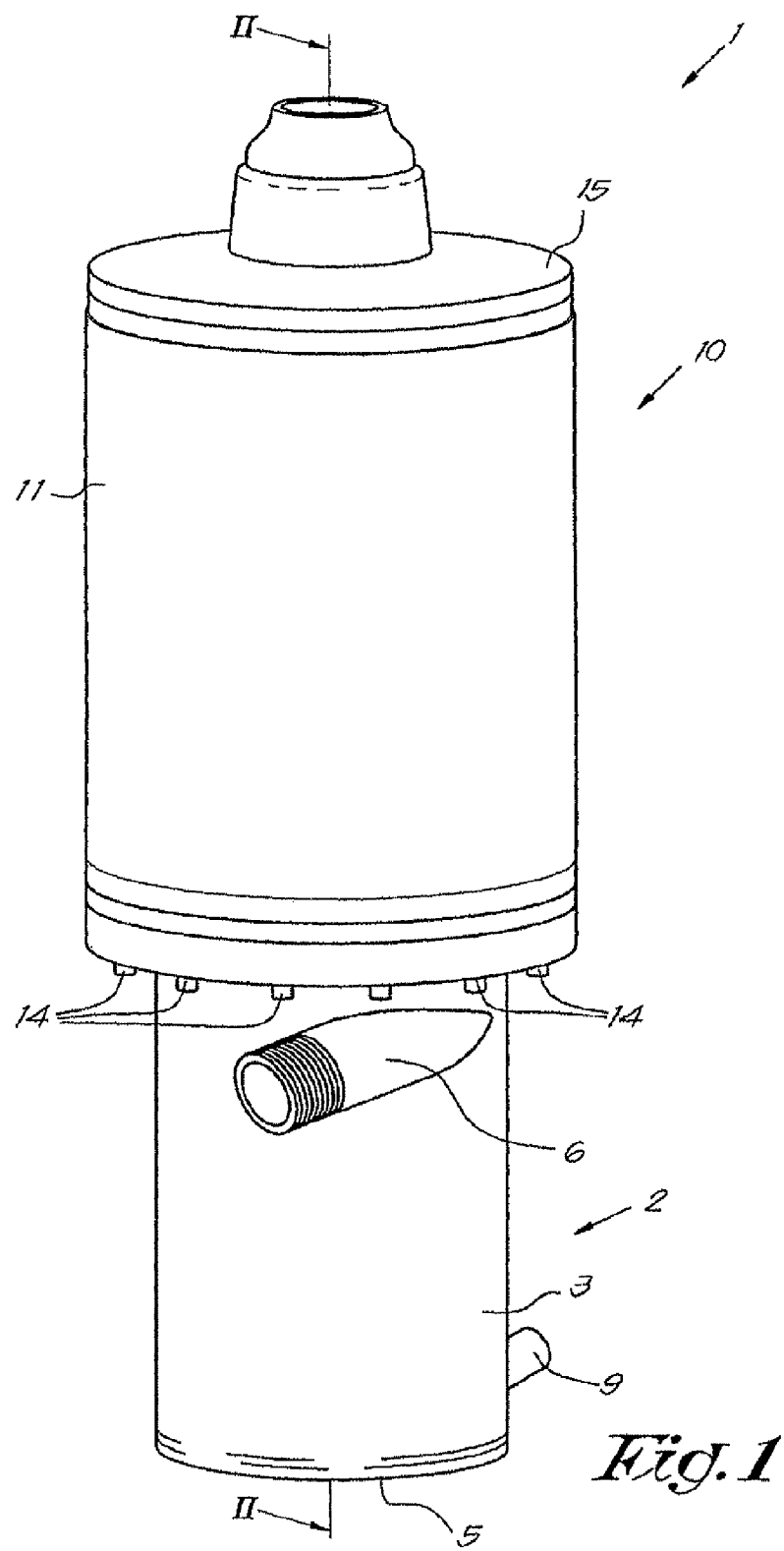
FIG. 1 schematically represents a liquid separator according to the invention in perspective.
Figure 5:
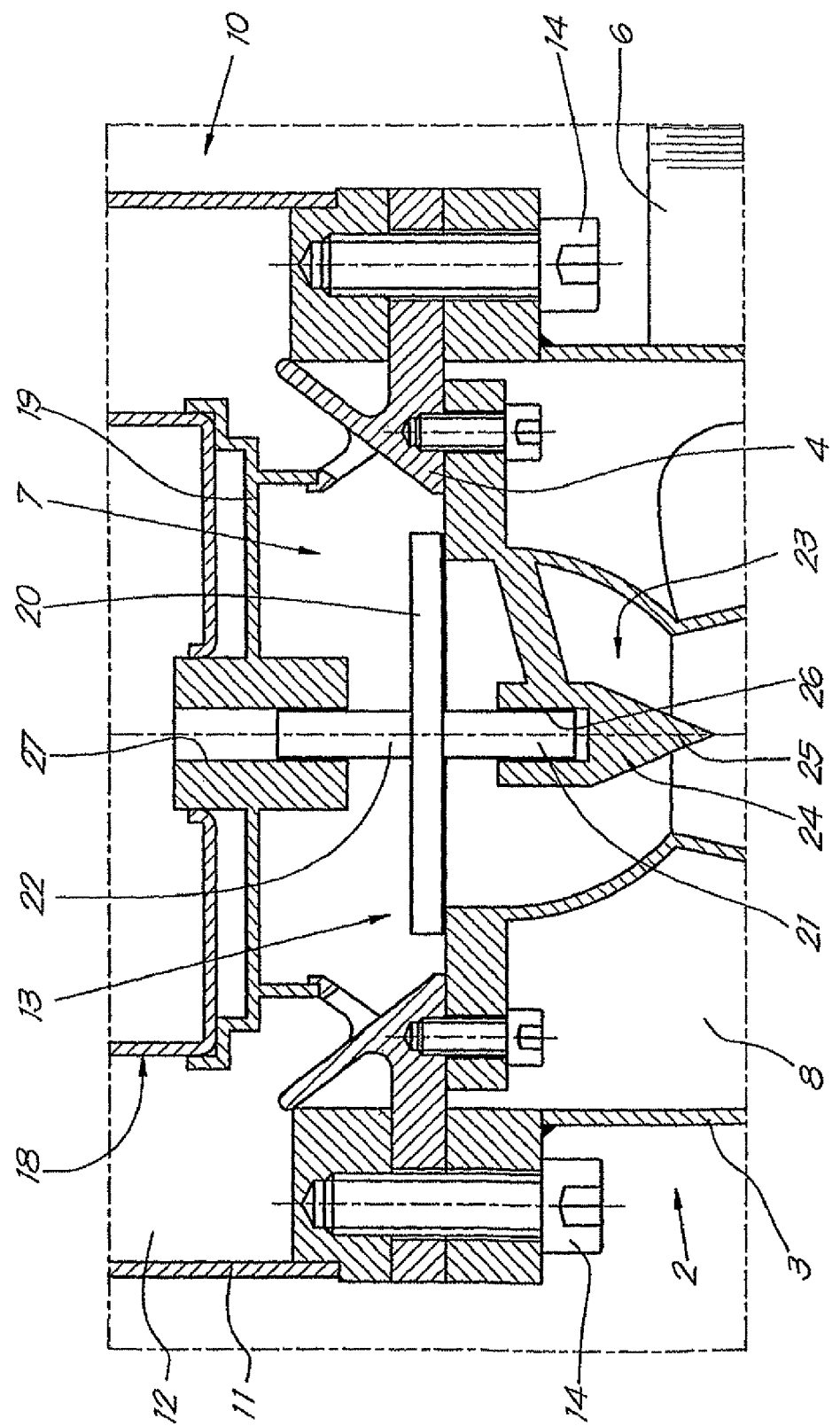

FIGS. 1 to 3 show a liquid separator 1 according to the invention which is provided with a centrifugal separator 2 formed of a cylindrical housing 3 with an upper wall 4 and a bottom wall 5 and with a tangential inlet 6 and an axial outlet 7, which housing 3 defines an inner space 8.

The above-mentioned outlet 7 is preferably provided centrally in the upper wall 4 of the housing 3.

The centrifugal separator 2 in this case also comprises a discharge orifice 9 for separated liquid, which discharge orifice 9 is preferably situated at the bottom of the centrifugal separator 2 when this centrifugal separator 2 is in a mounted position, i.e. in or near the above-mentioned bottom wall 5.

The liquid separator 1 according to the invention is also provided with a fine separator 10 comprising a housing 11 which defines a space 12 which is isolated from the inner space 8 of the centrifugal separator 2 by means of a non-return valve 13 providing for a flow from the centrifugal separator 2 to the space 12 in the fine separator 10.

The above-mentioned housing 11 is in this case connected at the bottom to the upper wall 4 of the centrifugal separator 2, for example by means of bolts 14.

At the top, the housing 11 of the fine separator 10 is sealed by means of a lid 15 in which has been centrally provided an outlet opening 16 for purified gas, which outlet opening is sealed by means of a minimum pressure valve 17 forming a connection between the space 12 and a take-off point for purified gas.

According to the invention, a flow-through element 18 is provided in the above-mentioned inner space 12 of the fine separator 10, for example in the form of a coalescence filter or another type of fine filter or, in other words, a filter making it possible to remove remaining liquid drops from the gas flow.

In this case, the above-mentioned flow-through element 18 is made cylindrical with walls that are permeable to gas, and the flow-through element 18 is sealed on one side, in the arrangement as represented on the lower side, by means of a sealing wall 19.

The upper side of the above-mentioned flow-through element 18 is fixed to the lid 15 and is positioned such that this flow-through element 18 extends entirely round the above-mentioned opening 16 and thus round the minimum pressure valve 17.

As is represented in more detail in FIG. 3, the above-mentioned non-return valve 13 is in this case made as a disc-shaped valve body 20 provided with a guiding pin 21, 22 respectively on either side and which rests on a seating formed by the upper wall 4 of the centrifugal separator 2.

The guiding pin 21 directed towards the centrifugal separator 2 can be axially shifted in guiding means 23 which are in this case formed of a predominantly conical body 24 which is fixed to the housing 3 and which is directed against the direction of flow of the gas with a pointed far end 25, in other words in the direction of the space 8, and whereby a guiding channel 26 is provided in said body 24 in which the guiding pin 21 can shift.

The above-mentioned conical body 24 is placed such in the upper wall 4 of the centrifugal separator 2 and designed such that the flow from the space 8 to the non-return valve 13, over the non-return valve 13 and to the flow-through element 18, takes place with flow losses that are as small as possible.

The pin 22 directed to the fine separator 10 can in this case shift in a small guiding channel 27 extending in the sealing wall 19 of the flow-through element 18.

The working of a liquid separator 1 according to the invention is very simple and as follows.

A mixture of compressed gas and liquid, such as a mixture of compressed air and oil drops coming from a liquid-injected compressor element, enters the space 8 via the inlet 6.

Thanks to the tangential implementation of the inlet 6 in the cylindrical housing 3, the incoming mixture of gas and liquid is subjected to a whirling motion.

A centrifugal separation hereby occurs, as the relatively heavy liquid particles are swung against the cylindrical wall of the centrifugal separator 2 under the influence of the centrifugal forces.

Under the influence of the gravitational force, the separated liquid trickles over the cylindrical wall to the lower side of the centrifugal separator 2, where this liquid is discharged via the outlet 9.

The gas leaving the centrifugal separator 2 flows via the above-mentioned non-return valve 13 into the space 12 of the fine separator 10 to subsequently flow through the cylindrical wall of the flow-through element 18 in view of the separation of the fine liquid drops that are still present in the gas flow.

Thanks to the presence of the conical body 24 at the outlet 7, a radial component is provided to the gas flow, making the inflow in the fine separator 10 easier and restricting the flow losses.

After its passage through the wall of the flow-through element 18, the purified gas flows through the minimum pressure valve 17 to be taken off by a user.

As the dimensions of the centrifugal separator 2 and the fine separator 10 are restricted and as the centrifugal separator 2 and the fine separator 10 are separated from one another by means of a non-return valve 13, the centrifugal separator and the fine separator of a liquid separator 1 according to the invention for a specific nominal pressure value come under a less stringent inspection category than the conventional liquid separators having the same nominal pressure value, thus reducing the inspection costs.

Thanks to the smaller design, savings can also be made on material and storage space, and the liquid separator 1 according to the invention is also lighter than the conventional liquid separators.

Also, when applying the liquid separator 1 on the compressed air outlet of an oil-injected compressor, as the compressor switches to no-load, only a restricted volume of gas will have to be blown off, since the non-return valve 13 is closed, as a result of which the blowing off can be done at a slower pace and foam formation is restricted, and moreover energy is saved as less pressure energy is thus blown off into the atmosphere.

The terms "upper wall" and "bottom wall" are used here in the context of the accompanying FIGS. 1 to 3, but it goes without saying that the liquid separator 1 according to the invention must not necessarily be erected entirely vertically, as is represented in the figures, but that it can also be used in other positions.

The present invention is by no means restricted to the embodiments described as examples and represented in the accompanying drawings; on the contrary, such a liquid separator 1 according to the invention can be made in all sorts of shapes and dimensions while still remaining within the scope of the invention.

The invention claimed is:

1. Liquid separator configured to enable circulation of a gas to be purified, said liquid separator comprising:
   a centrifugal separator comprising a cylindrical housing with a tangential inlet and an axial outlet and an inner space; and
   a fine separator comprising a housing arranged to define a space; said space being isolated from the inner space of the centrifugal separator by a non-return valve,
   wherein said non-return valve is configured to allow a fluid to flow from said inner space of the centrifugal separator to the space in the fine separator.

2. Liquid separator according to claim 1, wherein the housing of the fine separator is mounted against the housing of the centrifugal separator.

3. Liquid separator according to claim 2, further comprising a flow-through element within the fine separator.

4. Liquid separator according to claim 3, wherein the flow-through element comprises a fine filter.

5. Liquid separator according to claim 4, wherein the fine filter comprises a coalescence filter.

6. Liquid separator according to claim 1, further comprising a flow-through element having a cylindrical tube with walls that are permeable to gas.

7. Liquid separator according to claim 1, wherein the non-return valve comprises a valve body which, when the non-return valve is closed, co-operates with a seating formed by an upper wall of the centrifugal separator.

8. Liquid separator according to claim 7, wherein the valve body is provided with a guiding pin on either side.

9. Liquid separator according to claim 8, wherein a first pin of the guiding pins is directed towards the centrifugal separator and is shiftable in guiding means that are formed of a conical body which is fixed to the housing of the centrifugal separator and which is directed against the direction of flow of the gas with a sharp end, and in which is provided a guiding channel in which said first guiding pin is shiftable.

10. Liquid separator according to claim 8, including a second guiding pin directed towards the fine separator and which is shiftable in a small guiding channel extending in a bottom wall of the flow-through element.

11. Liquid separator configured to enable circulation of a gas to be purified, said liquid separator comprising:
    a centrifugal separator comprising a cylindrical housing with a tangential inlet and an axial outlet and an inner space; and
    a fine separator comprising a housing arranged to define a space, said space being isolated from the inner space of the centrifugal separator by a non-return valve,
    wherein the space in the fine separator is connected to a take-off point for purified gas via a minimum pressure valve.

* * * * *